US006579182B1

(12) United States Patent
Orus et al.

(10) Patent No.: US 6,579,182 B1
(45) Date of Patent: Jun. 17, 2003

(54) SLOT MACHINE WITH IN-BUILT SECURITY SYSTEM

(75) Inventors: Herve Orus, Carnoux (FR); Frederic Foglino, La Ciobat (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/485,050

(22) PCT Filed: Jul. 31, 1997

(86) PCT No.: PCT/FR98/01670

§ 371 (c)(1), (2), (4) Date: Jul. 18, 2000

(87) PCT Pub. No.: WO99/06971

PCT Pub. Date: Feb. 11, 1999

(30) Foreign Application Priority Data

Jul. 31, 1997 (FR) ............................................ 97 09830

(51) Int. Cl.$^7$ .......................... A63F 9/24; G06F 17/00; G06F 19/00

(52) U.S. Cl. ........................................................ 463/29

(58) Field of Search ..................... 463/25, 29; 235/380, 235/382

(56) References Cited

U.S. PATENT DOCUMENTS 4,575,622 A * 3/1986 Pellegrini ................... 235/382
4,764,666 A * 8/1988 Bergeron .................... 235/380
6,048,269 A * 4/2000 Burns et al. .................. 463/25
6,089,982 A * 7/2000 Holch et al. .................. 463/42

FOREIGN PATENT DOCUMENTS

| | | | | |
|---|---|---|---|---|
| DE | 9208368 | * 12/1992 | ............. G07F/7/08 |
| DE | G9208368.4 | 12/1992 | |
| EP | 0360613 A2 | 3/1990 | |
| EP | 0555565 A1 | 8/1993 | |
| WO | WO96/08798 | 3/1996 | |
| WO | WO 96/08798 | * 3/1996 | ........... G07F/17/32 |

* cited by examiner

*Primary Examiner*—Michael O'Neill
*Assistant Examiner*—Julie Brocketti
(74) *Attorney, Agent, or Firm*—Burns, Doane, Swecker & Mathis, L.L.P.

(57) ABSTRACT

The invention relates to a protected slot machine system including means of paying by smart card (300), a smart card reader-validator (200) and means (360, 400) of managing the credits available for games.

In order to prevent any fraud with respect to the sums of money actually won in the game, the system has control means (200, 450, 300) able to record, on the card (300) of a player, game-significant information (D) specific to the said card and able to effect a verification of this information.

15 Claims, 3 Drawing Sheets

SLOT MACHINE WITH IN-BUILT SECURITY SYSTEM

BACKGROUND

This application is based on French Patent Application No. 97/09830, filed on Jul. 31, 1997, which is incorporated by reference herein.

1. Field of the Invention

The invention relates to a slot machine system protected so as to prevent fraud or embezzlement.

The invention applies to any slot machine system whose machines have an electronic cash device referred to as a reader validator functioning with portable electronic payment means such as chip cards or any other equivalent means.

The invention also applies to machines having a mixed payment means, that is to say a coin (or token) cash device and a smart card cash device.

2. Background of the Invention

Smart cards can be unit loading cards or credit cards giving access to credit for gaming.

The problem which it is sought to resolve here is that of knowing whether the money loaded on the smart card of a player and which the latter seeks to be reimbursed is the money actually won on a slot machine.

In fact, the invention aims to prevent any fraud with regard to the sums of money actually won by the players.

SUMMARY OF THE INVENTION

To this end, provision is made according to the invention to systematically enter on the cards of the players game-significant information specific to the said cards and to check this information.

The solution proposed for this is to store on the smart card of the player information significant for the games and in particular the total value loaded (the sums loaded) on the card and the value of the winnings achieved (the sums won gambling) by this player. The total value loaded will be stored on the card by the game manager (in general the casino cashier), and the value of the winnings achieved will be stored by the reader validator of the slot machine.

Preferably this significant information will be given a certificate affording verification of the authenticity of this information.

The object of the invention is therefore more particularly a protected slot machine system having means of payment by smart card, a smart card reader-validator and means of managing the credit available for the games of the players, principally characterised in that it has control means able to effect a recording game-significant information on the card of a player, specific to the said card and able to effect a verification of this information.

According to another characteristic of the invention, the credit management means include management means internal to each slot machine and at least one terminal for loading or opening credits for the game and for verification, and the control means are distributed over the internal management of each machine, the reader-validator and the terminal.

To this end, the control means of the terminal include a calculation and processing unit and an associated memory containing a program for authorizing credit and recording at least one significant item of information on this credit and for verifying the significant information recorded on the cards of the players.

The control means of a reader-validator have a calculation processing unit and an associated memory containing a program for recording significant information on the game and for verifying this information.

The control means of the management means internal to a slot machine include a processing unit, a program memory and a data memory. The program memory contains a program for recording game-significant data in the data memory and means of activating the recording of the game-significant data on the card before return of the card by the machine.

According to one aspect of the invention, the game-significant information recorded on the card includes at least one data item representing the total value of the initial credit opened by this card—and a data item representing the winnings achieved.

According to another characteristic, the game-significant information also includes:

- a data item representing the credit available after the won or lost games played.

The available credit information is the result of updating of the initial credit information following losses made or winnings achieved.

Provision is also made, according to another characteristic of the invention, for the system to have means of calculating authentication certificates for the significant information recorded.

The means of calculating authentication certificates are distributed.

Where provision is made for a calculation of certificates, the stored data item corresponding to the total credit value opened is associated with an authentication certificate calculated for this value and the stored data item relating to the winnings achieved is also associated with an authentication certificate calculated for these winnings.

In this case, the terminal then contains means of calculating the authentication certificate for the initial credit information and verification means.

In this case also, each gaming machine reader-validator will also have means of calculating the authentication certificate for the winnings achieved and verification means.

BRIEF DESCRIPTION OF THE FIGURES

The invention will be more clearly understood from a reading of the description made below and which is given by way of illustrative and non-limitative example made with regard to the figures, in which.

DETAILED DESCRIPTION

Figure 1:
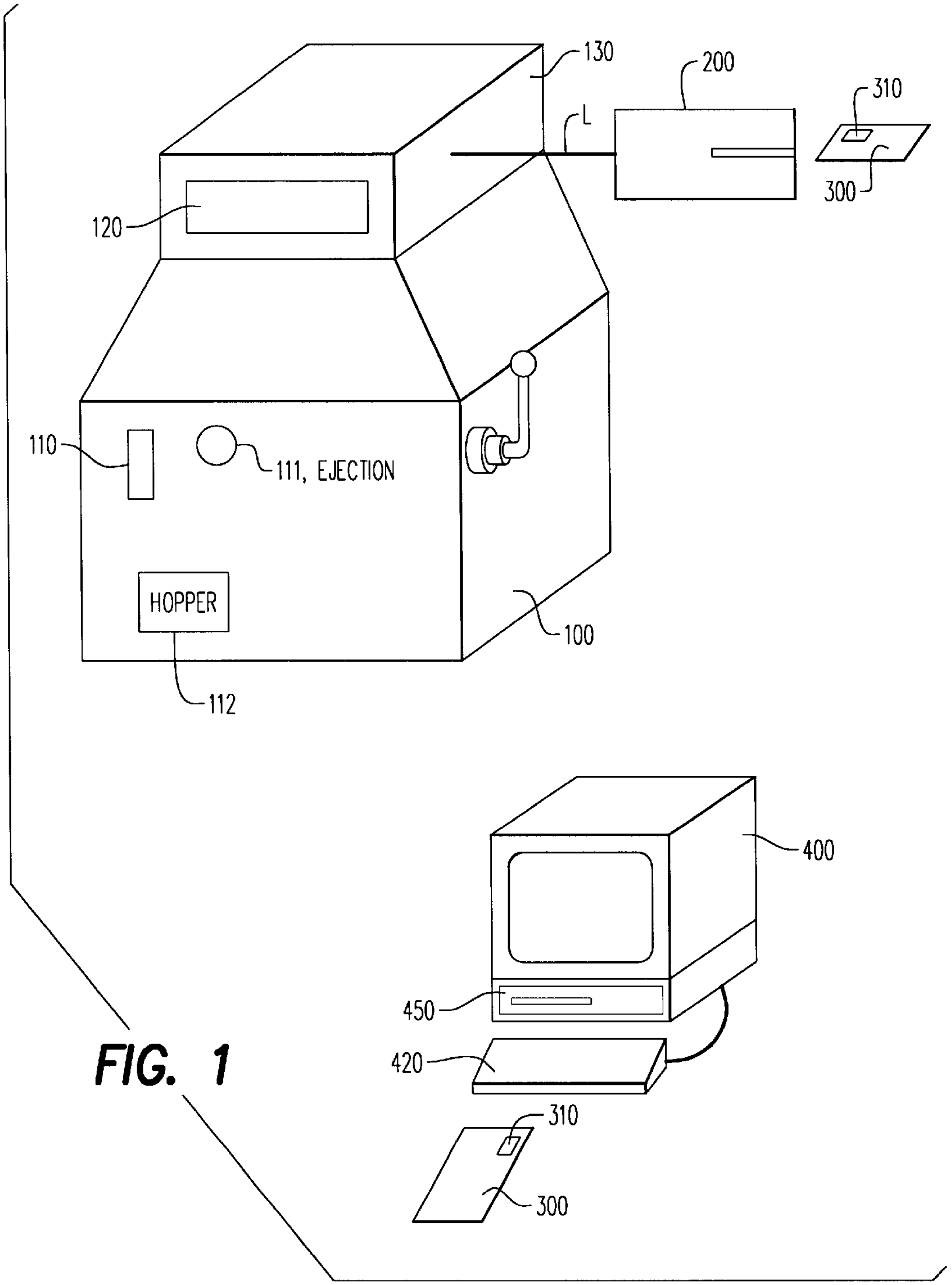
FIG. 1 depicts a protected slot machine system according to the invention.

The protected slot machine system proposed by the invention therefore comprises one or more slot machines. It is a case of slot machines as encountered in casinos and which have been depicted under the reference 100 in FIG. 1. The machine has an electronic cash device 200 which will be referred to hereinafter as a smart card reader-validator.

The reader-validator 200 is connected to the electronics 130 of the machine 100, for example by a serial connection of the RS232 type. The machine and reader have input/output interfaces adapted to this connection.

In a conventional manner, the machine is equipped with a display screen 120 which enables the player to know at any time the balance available to him for playing and the amount of winnings achieved.

The machine 100 which has been depicted can of course be a machine solely with an electronic cash device, but also a machine with a double cash device, that is to say a machine which has, in addition to this electronic cash device, a coin (or token) cash device shown by the reference 110.

In the case of a machine with a double cash device, the player will, in accordance with the invention, have the possibility of playing with coins or tokens and of having the winnings returned to him solely in the form of coins.

The integrated circuit cards contain at least one electrically programmable memory, for example an EEPROM memory 310.

It can also be a case of integrated circuit cards containing a microprocessor, a program memory and a working memory of the RAM type.

These integrated circuit cards can also be unit loading cards of the rechargable type. These cards have for this purpose an electrically programmable memory of the Boulier memory type.

The protected slot machine system also includes a terminal for issuing or opening or loading credit (all these expressions being equivalent within the meaning of the present invention), and for verification 400, for the players who present their smart card. This terminal is in practice the terminal of the casino cashier.

According to the type of cards used, granting a credit results in different operations for the terminal. In the case of a card with the loading of units of value, the issuing consists in recording units of value in the electrically programmable memory whose value corresponds to the amount of credit desired by the player and possibly also recording, in an area provided, the amount of this initial credit.

Where the card is a card of the credit card type, the operation consists in debiting an open account with the amount of the credit dedicated to playing.

The terminal 400 can be produced, for example, from a microcomputer equipped with a smart card reader of the type commercially available, loaded with an application program for fulfilling reader-recorder functions for smart cards.

According to the invention, the protected slot machine system illustrated by this FIG. 1 includes control means able to effect a recording of game-significant information on the cards of the players, specific to the said cards.

Game-significant information means information such as the initial game credit CJO granted to a player and the amount of winnings achieved GI, from bets made using this credit, between the time when the player has inserted his card in the machine card reader and the time he requests the return of his card. Naturally this significant information can also include information on the credit available CJI at the end of the different updatings of the initial credit CJO made following losses or winnings made by the player.

When a player wishes to obtain the issue of a credit, that is to say, with a loading card, the loading of playing units, he gives his smart card 300 to the operator authorised to use the terminal 400, who inserts this card in the reading part of this terminal 450 and which, by means of the keyboard 420, will enter the amount of the credit which the player wishes to have.

This amount is transferred to the reader 450 of the terminal and the corresponding units are then loaded into the smart card as well as, in accordance with the invention, the significant information comprising a data item CJO corresponding to the total value loaded: the credit desired by the player.

When the player stands in front of the slot machine 100 he inserts his smart card 300 into the reader 200 of the machine. For a better understanding reference can be made to the diagram in FIG. 2.

A reading of the information recorded on the card 300 is effected by this reader, which transmits it to the credit management device 130 of the machine.

As will be detailed later in the description, the control means according to the invention are distributed on the one hand over the slot machine and more precisely the credit management means 130 of this slot machine, and on the other hand over the reader-validator 200 connected to the slot machine and also over the credit and verification terminal 400.

In the case of the credit terminal, the control means are placed more precisely in the processing circuit 450 for performing operations of writing to and reading smart cards, that is to say in the electronic circuit 450 which performs the functions of a conventional smart card reader-recorder.

Figure 2:
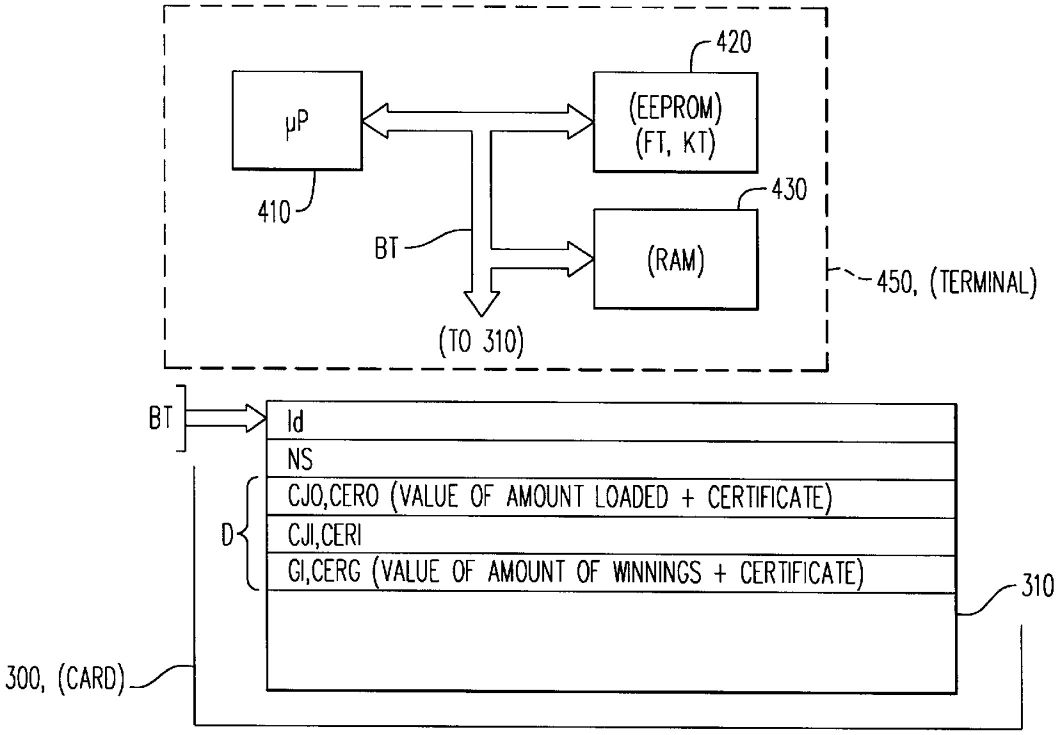
FIG. 2 depicts the electronic diagram of the circuit of the loading terminal 400 able to implement the invention.

As shown diagrammatically in FIG. 2, this circuit comprises a calculation and processing unit 410 implemented for example by a microprocessor connected to at least one electrically erasable memory 420. This memory will for example be an EEPROM memory and will contain the application programs for effecting the reading and recording on the smart cards. This program is adapted according to the different types of smart card provided, in a manner known to persons skilled in the art.

A working memory 430 is generally present in order to store the temporary data in the course of processing by the unit 410. It is a case of a volatile memory of the RAM type.

When a smart card is inserted in the loading and verification terminal 400, the electronic circuit 450 performs reading or writing operations on the memory 310 of the card 300 at the request of the operator 310 (the casino cashier).

This memory contains information identifying the holder Id. It also contains the serial number of the card NS.

It also contains, according to the invention, significant information D relating to the game in the memory 310.

According to a first variant embodiment, an item of significant information is the total value which has been loaded (the amount of initial available credit) for the player. This amount is referenced CJO in the diagram. It is entered on the card of the player by the terminal of the cashier 400.

However, the initial credit information CJO can be entered on the card by the terminal, but it can also be transferred in a centralized management center, the gaming machine system then being connected to this center by a communication network.

In this case, the initial credit amount CJO can be controlled by this centre by means of the terminal 400.

This solution is suited to cards of the credit card type.

The player then stands in front of a slot machine and inserts his card. He plays by betting money, and loses or wins. Before the slot machine returns the card, the slot machine, by means of the reader validator 200, updates the credit of the player and if necessary enters a data item corresponding to the available amount CJI. This amount is the result of the updatings of the initial credit CJO of the player following the different games undertaken by the player between the time he inserted his card and the time he requests its return.

Thus the stored amount corresponding to the available credit CJI is equal to the stored amount corresponding to the initial credit before any game undertaken, plus the winnings achieved and/or minus the losses made.

In accordance with the invention, before any return of the card to the player, the reader validator will enter, under the control of the electronics of the slot machine, a data item GI corresponding to the amount of winnings achieved.

Provision is made, according to a variant embodiment, for giving the significant information an authenticity certificate CERO for the data item CJO and CERG for the data item GI.

According to another variant embodiment, the significant information will include on the one hand the initial credit referenced CJO and on the other hand the available credit CJI and also the winnings achieved GI.

In this way it is possible to check that the winnings obtained are indeed the winnings achieved for games undertaken with this card. The check is made by the terminal 400.

In a preferred embodiment, these data are accompanied by an authentication certificate calculated by the device which recorded them on the card.

In the case of the initial credit CJO, the terminal will calculate the certificate CERO making it possible to authenticate this data item, using a cryptography function FT (the DES algorithm will for example be chosen) and by means of a secret key KT recorded in a protected manner in its program memory 420.

The terminal, when the player re-presents his card in order to be reimbursed for the winnings achieved for the credit still available, will recalculate the certificate CERO and verify that the calculated certificate does indeed correspond to the certificate calculated when the card was returned.

Since the terminal is the only one to have the key used for calculating the certificate, it is consequently the only one to find the same certificate value in so far as the initial credit information has not been falsified.

Significant information such as the available credit CJI and the winnings GI obtained are on the other hand entered by the smart card reader 200 when the card is returned to the player.

For this purpose, the reader 200 receives this information from the electronics of the machine 130. This transmission is occasioned by the command to return the card by the player, that is to say as soon as the player presses a card return request button 111.

The reader 200 then records this significant information on the card.

Where provision is made for the reader to calculate an authentication certificate for each of these items of information, the reader then has a secret key KL for this calculation and a cryptography function FL such as the algorithm DES, for example.

The winnings authentication certificate CERG will be obtained at the end of a calculation of a quantified data item including the winnings GI and the serial number of the card by means of the function FL and the secret key KL.

The certificate CERI is then the result of the calculation of the value quantified by the cryptography function DES and the key KL of the data item formed by the value CJI and the serial number of the card.

The certificate CERI is then expressed mathematically by the equation:

CERG=FL (GI, NS, KL).

The certificate CERJ is then expressed mathematically by the equation:

CERI=FL (CJI, NS, KL).

The function FL is for example the cryptography function defined by the algorithm DES.

A distinct secret key can of course be provided for each of these calculations.

Figure 3:
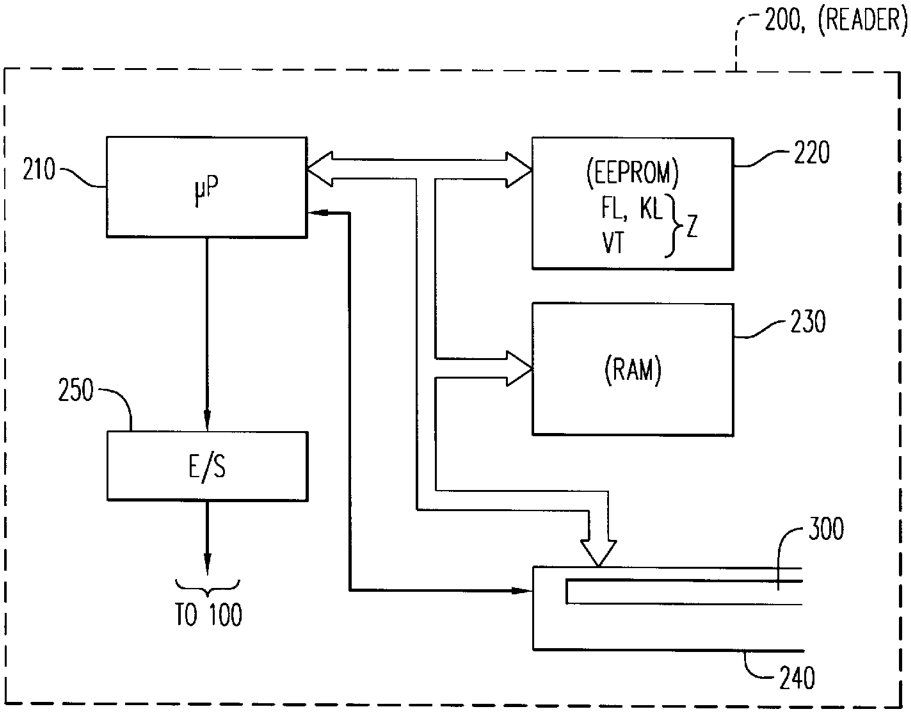
FIG. 3 depicts an electronic diagram of a reader-validator for slot machines able to implement the present invention.

The electronic diagram of the reader is depicted in FIG. 3. This reader has, in a conventional fashion, a processing unit 210 connected by a communication bus to a program memory 220. This memory is an electrically non-volatile memory, for example electrically programmable (a memory of the EEPROM type).

The processing unit is also connected to a working memory 230 of the RAM type.

The reader also has a conventional mechanism 240 for inserting the card, In accordance with ISO 7816-3, the processing unit 210 (microprocessor) detects the presence of a card and passes a current through it and sends it its first command "Reset". The card receives this command and sends a"Response to Reset". This response allows recognition of the type of card so that the communication can be continued in accordance with a given protocol.

The reader 200 also has an input/output interface 250 allowing connection through a serial link with the slot machine, and more particularly with the electronics 130 of the slot machine.

The interface bears the reference 250 in this figure.

The program memory 220 of the reader 200 has, in a protected area Z, a verification function VT adapted according to the cryptography algorithm used FT so as to effect an authentication of the significant information CJO which will have been entered by the loading and verification terminal. The memory 220 also has, in the protected area Z, the secret key or keys KL which make it possible to calculate the authentication certificate for the credit information available and winnings achieved.

The verification terminal 400 for its part has in its program memory 420 a verification function VL adapted to the quantification algorithm FL used which enables it to verify the calculations of the certificates CERI and CERG produced by the reader 200.

In the event of disagreement or falsification of the information entered by the reader, the terminal will detect the fraud and can reject the instruction to reimburse the winnings achieved or credit available.

Figure 4:
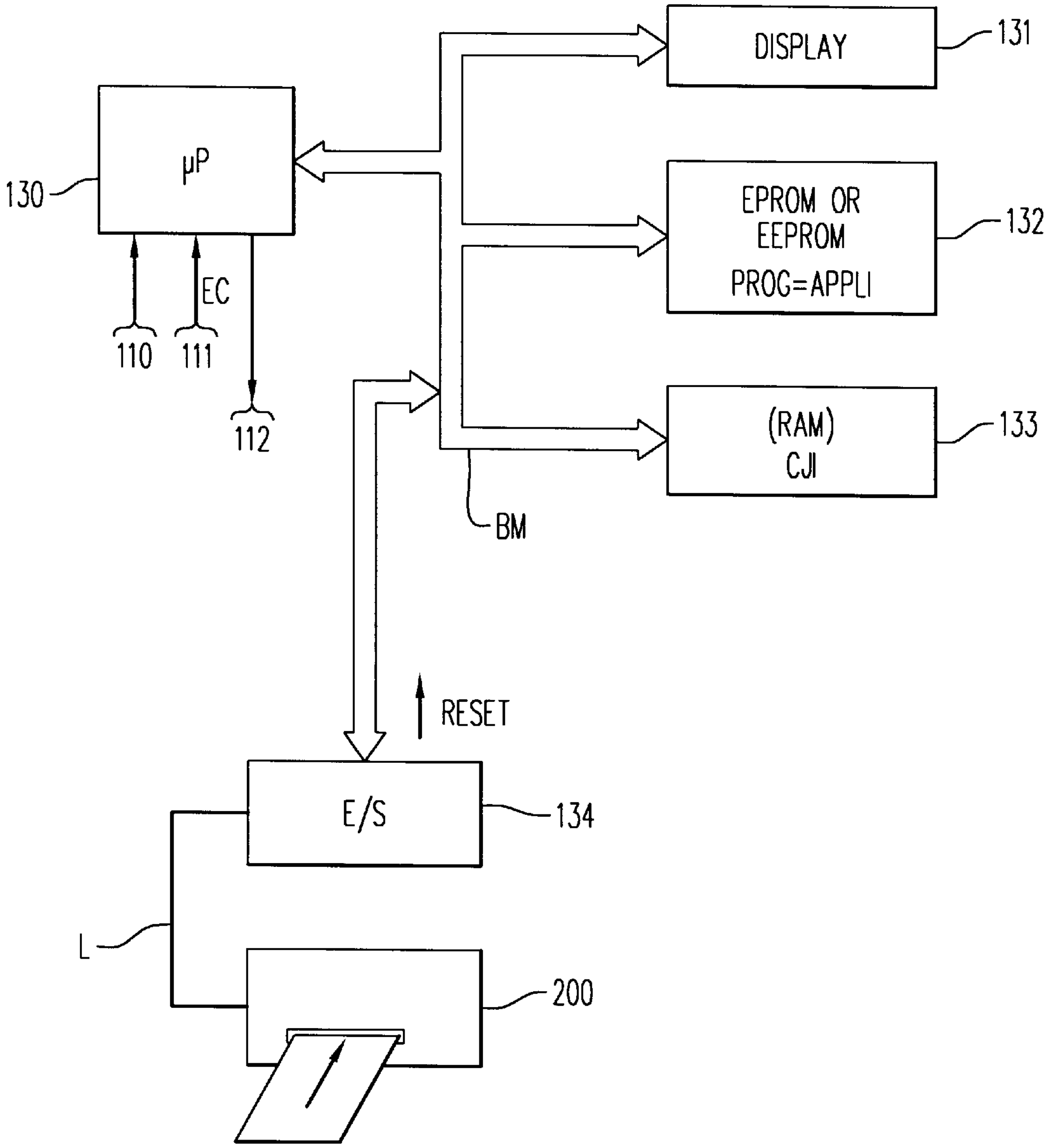
FIG. 4 depicts the electronic diagram of the internal management means of a slot machine according to the invention.

FIG. 4 illustrates the electronics of the gaming machine, these electronics also being of a known type. It includes a processing unit 130 (for example a microprocessor) connected to one or more memories and in particular to a non-volatile program memory 132, for example electrically programmable.

This unit 130 is also connected to a working memory 133 of the RAM type which makes it possible to store information relating to the game or games undertaken by the player throughout the game. The processing unit 130 also makes it possible to control a display screen 131 so that the player can display the game-significant information, in particular the balance available to him.

The electronic circuit 130 also includes an input/output interface 134 similar to the interface 250, which makes it possible to establish the link between the reader-validator 200 and the processing unit 130 of the slot machine. A serial link L connects this interface to the reader 200.

The command 111 to eject the card is in the form of a button which can be actuated by the player, which sends to the unit 130 an instruction EC to eject the card.

Where the machine has a double cash device: a smart card cash device and token cash device, it has a token input (ref 110 in FIG. 1) which transmits the input token level to the unit 130 and a token hopper 112 which receives these tokens.

What is claimed is:

1. A protected slot machine system comprising:

a smart card reader-validator and means including at least one terminal for managing credits available for games played on said slot machine system, and control means for recording on a smart card, game-significant information specific to said card, including means associated with said terminal for recording at least one data item representing the total value of an initial credit stored in the card and a first authentication pertaining thereto in a first area of memory, and means associated with said reader-validator for recording a data item representing the value of winnings achieved during play of said games and second authentication pertaining thereto in a second area of memory separate from said first area, and means associated with each of said terminal and said reader-validator for effecting verification of the information recorded in each of said first and second areas.

2. A protected slot machine system according to claim 1, wherein the credit management means further include management means internal to each slot machine, and wherein said control means are distributed over the internal management means of each machine, over the reader-validator and over the terminal.

3. A protected slot machine system according to claim 2, wherein the terminal control means include a calculation and processing unit and an associated memory containing a program for authorizing credit and recording said at least one item of significant information on this credit and for verifying the significant information recorded on the cards of the players.

4. A protected slot machine system according to claim 3, wherein the means for controlling a reader-validator include a calculation and processing unit and an associated memory containing a program for recording significant information on a game and for verifying this information.

5. A protected slot machine system according to claim 3, wherein the control means for the management means internal to a slot machine include a processing unit, a program memory and a data memory, the program memory containing a program for recording significant data on a game in the data memory and means for activating the recording of the significant data on the game on the card before return of the card by the machine.

6. A protected slot machine system according to claim 2, wherein the means for controlling a reader-validator include a calculation and processing unit and an associated memory containing a program for recording said significant information on a game and for verifying this information.

7. A protected slot machine system according to claim 6, wherein the control means for the management means internal to a slot machine include a processing unit, a program memory and a data memory, the program memory containing a program for recording significant data on a game in the data memory and means for activating the recording of the significant data on the game on the card before return of the card by the machine.

8. A protected slot machine system according to claim 2, wherein the control means for the management means internal to a slot machine include a processing unit, a program memory and a data memory, the program memory containing a program for recording significant data on a game in the data memory and means for activating the recording of the significant data on the game on the card before return of the card by the machine.

9. A protected slot machine system according to claim 1, wherein the significant information also includes:

a data item representing the credit available after played games won or lost.

10. A protected slot machine system according to claim 9, wherein the available credit information is the result of updatings of the initial credit information following losses made or winnings achieved.

11. A protected slot machine system according to claim 9, further comprising means for calculating authentication certificates for the significant information.

12. The protected slot machine of claim 1 wherein said first authentication and said second authentication comprise authenticity certificates.

13. A protected slot machine system comprising:

a smart card reader-validator and means including at least one terminal for managing credits available for games played on said slot machine system, and control means for recording on a smart card, game-significant information specific to said card, including means associated with said terminal for recording at least one data item representing the total value of an initial credit stored in the card and a first authentication pertaining thereto calculated in accordance with a first secret key, and control means associated with the reader-validator for recording a data item representing the value of winnings achieved during play of said games and second authentication pertaining thereto calculated in accordance with a second secret key, and means associated with each of said terminal and said reader-validator for effecting verification of this recorded information.

14. The protected slot machine of claim 13 wherein the first and second secret keys are respectively stored in said terminal and in said reader-validator.

15. The protected slot machine of claim 13 wherein said first authentication and said second authentication comprise authenticity certificates.

* * * * *

UNITED STATES PATENT AND TRADEMARK OFFICE

CERTIFICATE OF CORRECTION

PATENT NO. : 6,579,182 B1
DATED : June 17, 2003
INVENTOR(S) : Herve Orus et al.

It is certified that error appears in the above-identified patent and that said Letters Patent is hereby corrected as shown below:

Title page, Item [54] and Column 1, line 1,
Correct the title to read:
-- PROTECTED SLOT MACHINE SYSTEM --.

Title page,
Item [22], PCT Filed, correct the date to read:
-- July 28, 1998 --

Signed and Sealed this

Twenty-second Day of June, 2004

JON W. DUDAS
*Acting Director of the United States Patent and Trademark Office*